(12) United States Patent
Bassett et al.

(10) Patent No.: US 7,086,211 B2
(45) Date of Patent: Aug. 8, 2006

(54) METHOD, APPARATUS AND SYSTEM FOR EVACUATION OF CONTAINERS

(76) Inventors: Wade M. Bassett, 6674 201st St., Albia, IA (US) 52531; Lisa L. Bassett, 6674 201st St., Albia, IA (US) 52531

( * ) Notice: Subject to any disclaimer, the term of this patent is extended or adjusted under 35 U.S.C. 154(b) by 0 days.

(21) Appl. No.: 10/681,598

(22) Filed: Oct. 8, 2003

(65) Prior Publication Data
US 2005/0076616 A1    Apr. 14, 2005

(51) Int. Cl.
B65B 31/06 (2006.01)
(52) U.S. Cl. .......................... 53/434; 53/512
(58) Field of Classification Search ................ 53/432, 53/434, 510, 512, 79; 206/524.8; 383/61.2, 383/63, 100, 111; 99/472; B65B 31/06
See application file for complete search history.

(56) References Cited

U.S. PATENT DOCUMENTS

| | | | |
|---|---|---|---|
| 2,778,171 A | 1/1957 | Taunton | |
| 3,471,871 A * | 10/1969 | Nociti et al. ................ | 4/484 |
| 3,516,223 A | 6/1970 | Andersen et al. | |
| 3,688,463 A | 9/1972 | Titchenal | |
| 3,699,742 A | 10/1972 | Giraudi | |
| 3,928,938 A | 12/1975 | Burrell | |
| 3,965,646 A | 6/1976 | Hawkins | |
| 4,018,030 A | 4/1977 | Christensson | |
| 4,035,982 A | 7/1977 | Paules | |
| 4,164,111 A | 8/1979 | Di Bernardo | |
| 4,330,975 A | 5/1982 | Kakiuchi | |
| 4,372,096 A | 2/1983 | Baum | |
| 4,541,224 A | 9/1985 | Mugnai | |
| 4,545,177 A | 10/1985 | Day | |
| 4,561,925 A | 12/1985 | Skerjanec et al. | |
| 4,578,928 A | 4/1986 | Andre et al. | |
| 4,581,764 A | 4/1986 | Plock et al. | |
| 4,637,061 A * | 1/1987 | Riese ........................... | 383/38 |
| 4,860,523 A * | 8/1989 | Teteishi et al. ................ | 53/512 |
| 5,215,445 A | 6/1993 | Chen | |
| 5,287,680 A * | 2/1994 | Lau ............................. | 53/512 |
| 5,396,751 A | 3/1995 | Chi | |
| 5,481,852 A | 1/1996 | Mitchell | |
| 5,548,944 A * | 8/1996 | Prochut et al. ................ | 53/511 |
| 5,551,213 A * | 9/1996 | Koelsch et al. ............... | 53/434 |
| 5,664,408 A | 9/1997 | Chesterfield et al. | |
| 5,839,582 A * | 11/1998 | Strong et al. ............. | 206/524.8 |
| 5,873,217 A | 2/1999 | Smith | |
| 6,020,013 A * | 2/2000 | Kozma ........................ | 426/393 |
| 6,085,906 A * | 7/2000 | Lambert ................... | 206/524.8 |

(Continued)

FOREIGN PATENT DOCUMENTS

DE  2628913  * 1/1978

(Continued)

OTHER PUBLICATIONS

PTO 06-2007, English language translation of DE 3335151, Jan. 2006.*

(Continued)

*Primary Examiner*—Stephen F. Gerrity
(74) *Attorney, Agent, or Firm*—McKee, Voorhess & Sease, P.L.C.

(57) ABSTRACT

A device for evacuating a container is disclosed. The device includes a nozzle for placing within the container, a first air conduit operatively connecting the nozzle and a separation chamber, a second air conduit operatively connecting the separation chamber and a pump. A system that includes a reusable plastic bag and methods for using a device for air evacuation, and a plastic bag are disclosed.

45 Claims, 12 Drawing Sheets

U.S. PATENT DOCUMENTS

| | | | |
|---|---|---|---|
| 6,123,969 A | 9/2000 | Sjöberg | |
| 6,161,695 A * | 12/2000 | Nicolais | 206/438 |
| 6,231,236 B1 * | 5/2001 | Tilman | 383/61.2 |
| 6,256,968 B1 * | 7/2001 | Kristen | 53/512 |
| D451,794 S * | 12/2001 | Ichikawa | D9/709 |
| 6,520,071 B1 | 2/2003 | Lanza | |
| 6,523,330 B1 | 2/2003 | Hurd | |
| 6,543,491 B1 * | 4/2003 | Chung | 141/65 |
| 6,623,413 B1 * | 9/2003 | Wynne | 493/101 |
| 6,626,092 B1 * | 9/2003 | Tarlow | 99/472 |
| 6,763,857 B1 * | 7/2004 | Brown | 141/65 |
| 2003/0140603 A1 * | 7/2003 | Krasenics et al. | 53/434 |
| 2004/0177595 A1 * | 9/2004 | Kozak | 53/434 |
| 2005/0023179 A1 * | 2/2005 | Albritton | 206/524.8 |

FOREIGN PATENT DOCUMENTS

| | | | | |
|---|---|---|---|---|
| DE | 2828770 | * | 1/1980 | |
| DE | 3335151 | * | 4/1985 | |
| DE | 3340340 | * | 5/1985 | |
| DE | 3500803 | * | 7/1986 | 53/79 |
| JP | 02191120 A | * | 7/1990 | |

OTHER PUBLICATIONS

PTO 06-2245, English language translation of DE 3500803, Feb. 2006.*

*SEALit* Instruction Manual, Model SI-300 (2005), (8 pages).

*PROTECTit* Instruction Manual, Model SI-100 (2005), 4 pages).

* cited by examiner

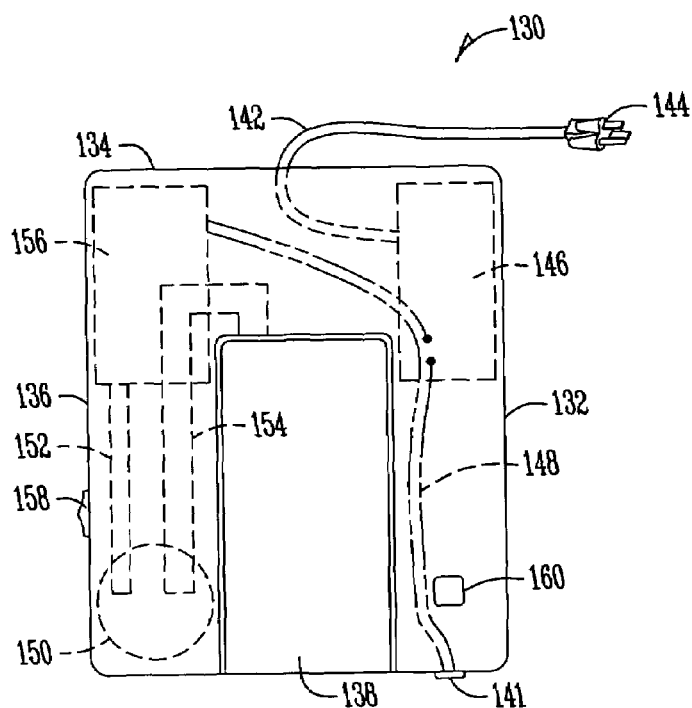
Fig.8
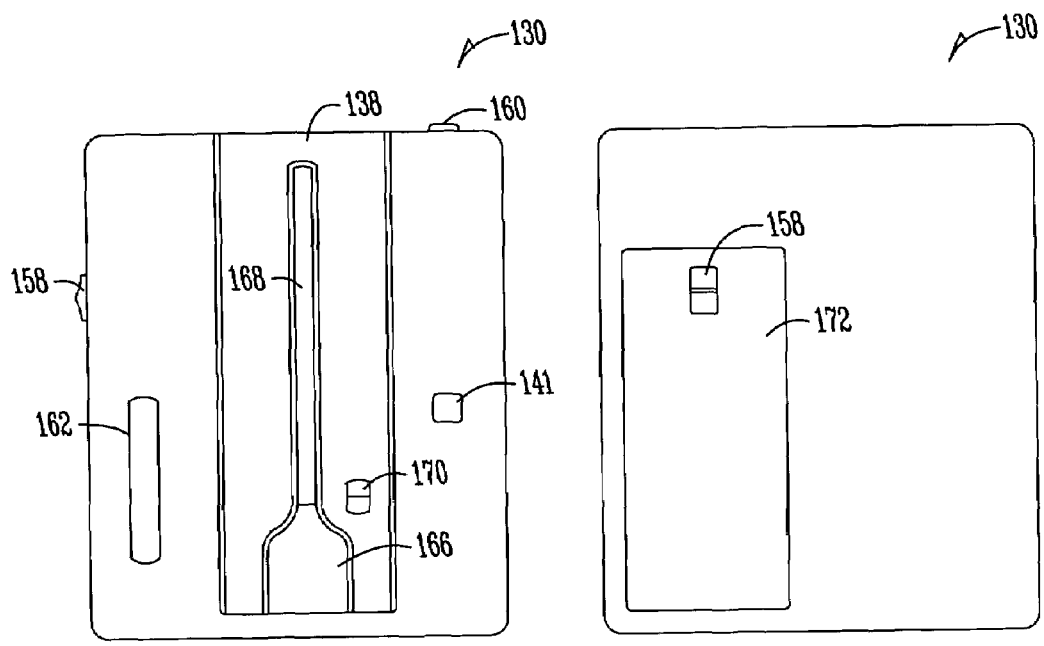
Fig.9
Fig.10

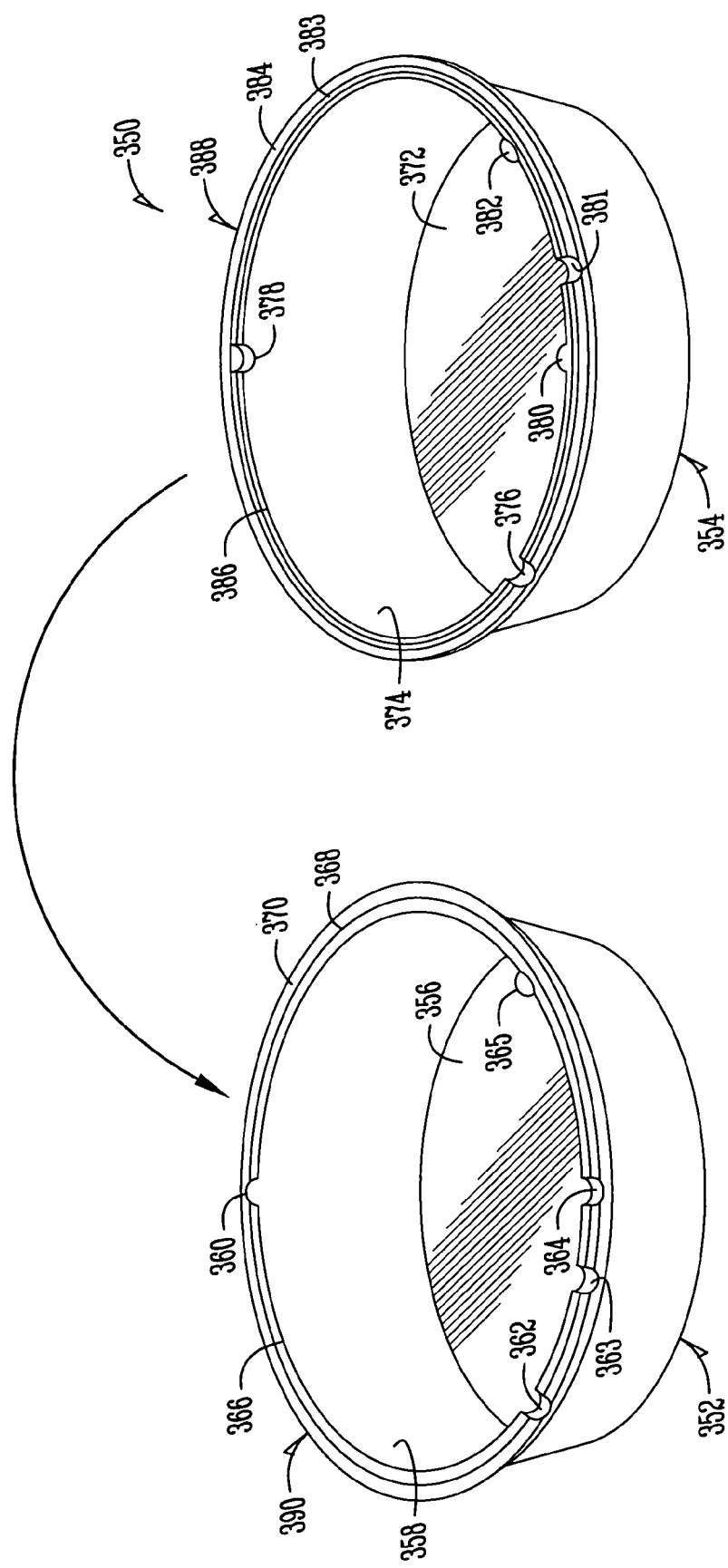

METHOD, APPARATUS AND SYSTEM FOR EVACUATION OF CONTAINERS

BACKGROUND OF THE INVENTION

The present invention relates to evacuation of containers. More particularly, but without limitation, the present invention relates to a device and methods for evacuation of air from various containers.

There are numerous problems related to the use of containers to store items, including but not limited to food items. Containers, such as plastic bags are widely used within the home to store food items and other items. The advantages of using such containers for storing food include maintaining freshness or extending the life of the food.

Devices such as the FOOD SAVER have been used to evacuate air and heat seal plastic bag containers. Despite attendants advantages, problems remain. In particular, when bags are heat sealed, they require special bags which are typically required to be heavier duty in construction and therefore more expensive. The seal must be cut open each time, decreasing bag size. In addition, the heat sealing bags cannot be conveniently and quickly re-sealed. In addition, such devices that provide for heat sealing are typically relatively expensive in nature and require considerable counter space given their limited use within the home.

Therefore, what is needed is an improved method, apparatus and system for evacuating air from containers.

Thus, it is a primary object, feature, or advantage of the present invention to provide a method, apparatus, and system for evacuating containers that improves upon the state of the art.

Another object, feature, or advantage of the present invention is to provide a method, apparatus, and system for evacuating containers that encourages food safety in the storing of food.

Yet another object, feature, or advantage of the present invention is to provide a method, apparatus, and system for evacuating containers that is easy to use or operate.

A further object, feature, or advantage of the present invention is to provide a method, apparatus, and system for evacuating containers that is inexpensive to use.

A still further object, feature, or advantage of the present invention is to provide a method, apparatus, and system for evacuating air from containers that allows the containers to be reused.

Another object, feature, or advantage of the present invention is to provide a method, apparatus, and system for evacuating air from containers, for example that facilitates the storage of food without smashing the food.

Another object, feature, or advantage of the present invention is to provide a method, apparatus, and system for evacuating air from containers that can be conveniently used in a kitchen and other environment.

A further object, feature, or advantage of the present invention is to provide a bag for use with an air evacuation device.

These and/or other objects, features or advantages of the present invention will become apparent from the specification and claims that follow.

SUMMARY OF THE INVENTION

The present invention provides for a method, apparatus and system for evacuation of air from containers. According to one aspect of the present invention, a device for evacuating air from a container is disclosed. The device includes a nozzle for placing in the container, an air conduit operatively connected to the nozzle and to a separation chamber, and a second air conduit operatively connecting the separation chamber and a pump. The pump draws air through the separation chamber and through the nozzle in order to evacuate the air from the container. The separation chamber is used to store liquid material or particulate matter that is drawn through the nozzle, but should not reach the pump. The device can include an accessory for increasing the distance between the container and that device. For example, the device can be placed under a cabinet, range, soffit or other item, while the device can be placed on a countertop, and a tube or other air conduit can connect the device and the accessory.

According to another aspect of the present invention, the device can include an arm that extends outwardly and upwardly from a base portion of the device. This allows the device to conveniently accommodate containers of various sizes. In such an embodiment the device can be conveniently placed on a countertop.

According to another aspect of the present invention a method of evacuating air from a container is disclosed. The method includes providing a device having a nozzle for placing within the container, a first air conduit operatively connecting the nozzle and a separation chamber, and a second air conduit operatively connected to the separation chamber and a pump. The discharge from the pump could be ran through an air conduit and exhausted outside the device or internally collected. Then, according to the method, the nozzle is inserted into the container. Air is evacuated from the container, and the container is sealed with one or more seals.

Another aspect of the present invention includes a system for storage. According to the system, a removable plastic bag with a plurality of seals is used. In addition, a device for evacuating air is used. The device has a nozzle for placing in the plastic bag, an air conduit operatively connecting the nozzle to a separation chamber, and another air conduit operatively connecting the separation chamber and a pump. The discharge from the pump can be run through an air conduit and exhausted outside the device or internally collected. This system also includes a rigid container that can be placed within the plastic bag for preventing items from being distorted. Thus, items can be placed within the rigid container and then the rigid container can be placed within the resealable plastic bag. Then the evacuation device can remove air from the resealable plastic bag in order to prepare the item for storage.

A further aspect of the invention relates to a reusable plastic bag. The reusable plastic bag includes a cavity for storing items formed from opposite first and second side walls. The removable plastic bag includes a first and a second seal where each seal is formed from first and second fastening strips on opposite side walls. There is a spacing between the first seal and the second seal sufficiently large such that the first seal is independent of the second seal and the bag is reusable as it is sealable even if one of the plurality of seals is damaged.

Another aspect of the present invention relates to a plastic bag and a method of using the plastic bag. The method includes providing a reusable plastic bag with at least one seal and a top portion above the at least one seal. According to the method, the top portion of the bag is cuffed, the bag is filled, the bag is uncuffed, and the bag is sealed. Preferably, the bag includes two seals and there is a spacing between the first and second seal sufficiently large such that the first seal is independent of the second seal and the bag is reusable as it is sealable even if one of the first seal or the second seal is damaged. The bag need only include one seal however, with the seal being spaced a sufficiently large enough distance from the top of the bag to allow for cuffing of the bag to protect the top portion of the outer surface of the bag.

BRIEF DESCRIPTION OF THE DRAWINGS

FIG. 8 is a top view of one embodiment of an air evacuation device of the present invention.

FIG. 9 is a front view of one embodiment of an air evacuation device of the present invention.

FIG. 10 provides a side view of one embodiment of an air evacuation device of the present invention.

FIG. 19 provides a perspective view of one embodiment of a rigid container according to the present invention.

DETAILED DESCRIPTION OF THE PREFERRED EMBODIMENT

Figure 1:
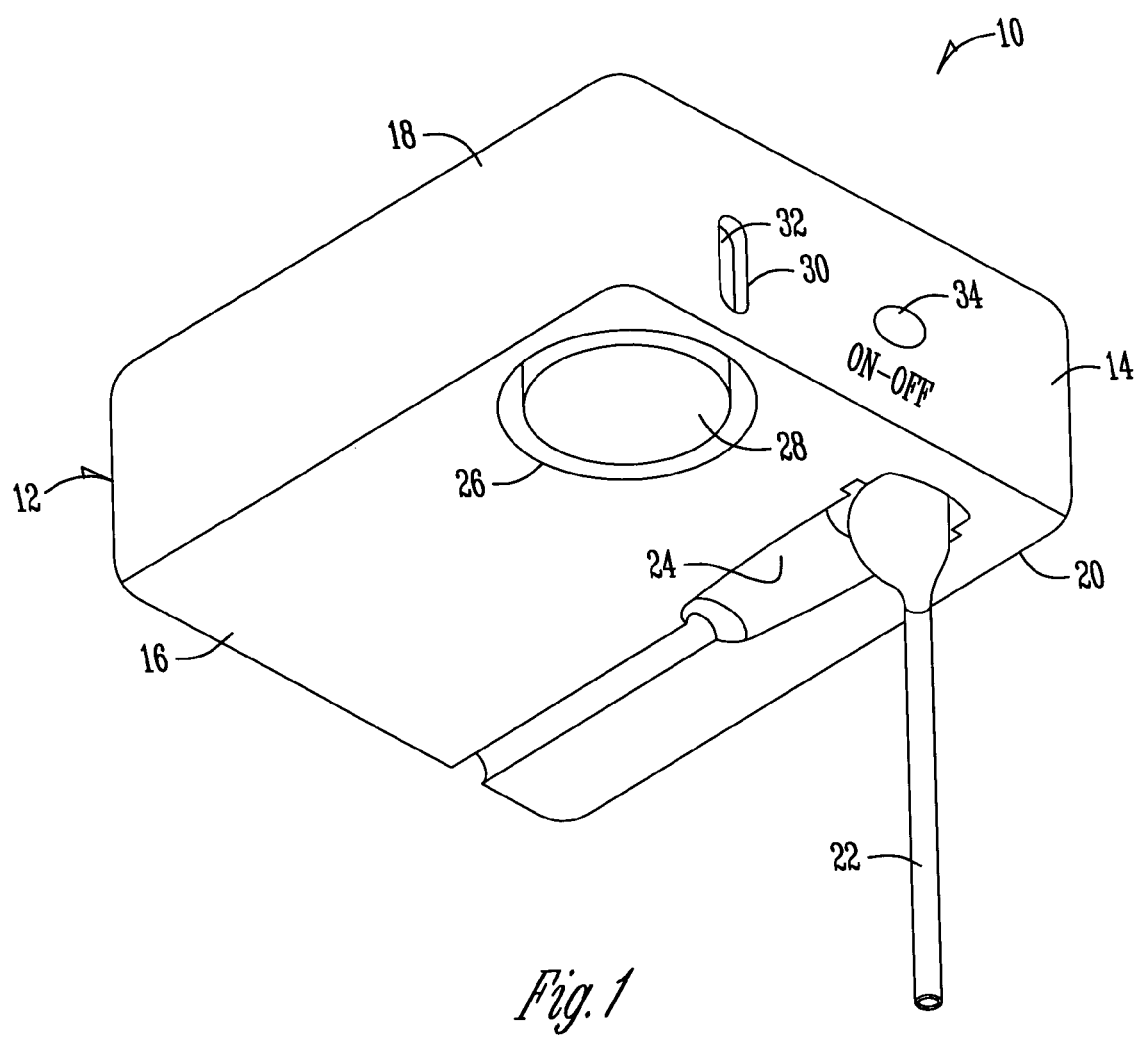
FIG. 1 is a perspective view of one embodiment of an air evacuation device of the present invention suitable for mounting under a cabinet or counter.
Figure 7:
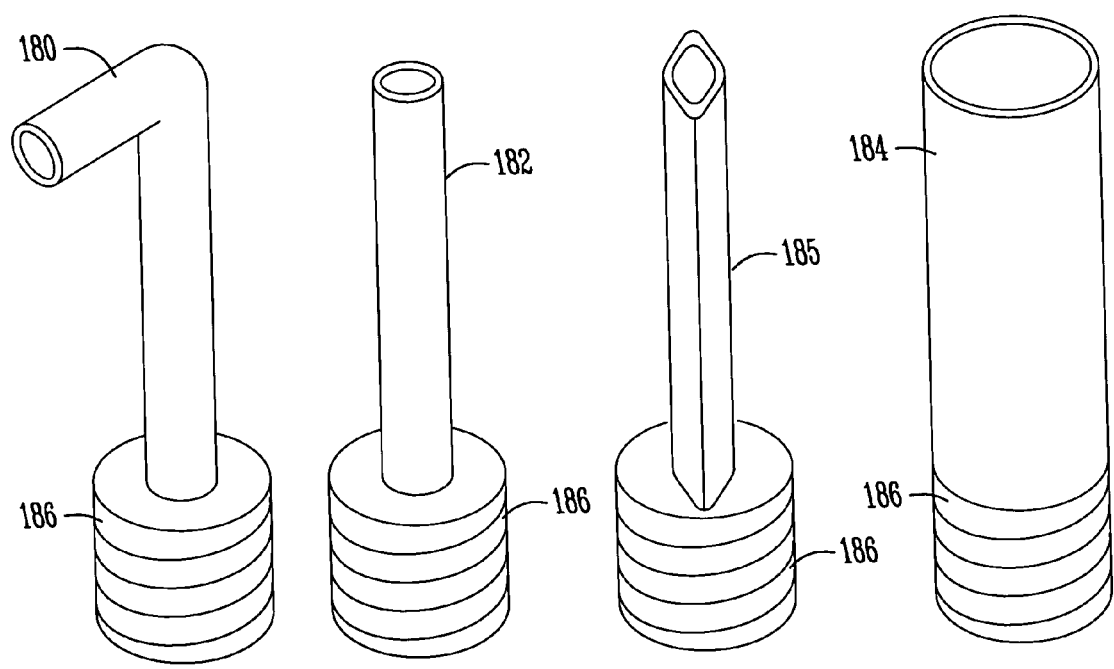
FIG. 7 provides a perspective view of four different types of nozzles that can be used according to one embodiment of the present invention.

The present invention includes methods, apparatus, and system for evacuating air from containers. The present invention recognizes that the containers can be used to store any number of items, including, but not limited to food items. Several embodiments are described herein. FIG. 1 illustrates one embodiment of an air evacuation device 10. The device includes a housing 12. The housing includes a front wall 14, a bottom surface 16, and side walls 18 and 20. A nozzle 22 can extend downwardly and outwardly from the housing 12. The nozzle 22 as shown is a foldable nozzle that can also fold back into the recess 24 of the housing when not in use. Preferably, the nozzle 22 is removable and exchangeable with other types of nozzles for cleaning and promoting food safety, some examples of which are shown in FIG. 7.

Returning to FIG. 1, there is an aperture 26 in the housing to accommodate a separation chamber 28. As air is evacuated from a container, it is contemplated that liquid and small particles may also be drawn into the device 10. The separation chamber 28 is where filtered liquids and particulate matter would accumulate so that this matter is not drawn into the pump itself. Although a sight is shown, the present invention contemplates that other types of indicators can be used, including electronic indicators to display or indicate the fill level of the separation chamber. In such an embodiment, sensors can be used to determine the fill level. The separation chamber 28 can be removed from time to time to empty the separation chamber 28. Therefore, it is preferable that the separation chamber 28 be easily removable. In addition, there is an indicator such as a sight 30 formed through an aperture in the housing 12 that allows a fill level of the separation of chamber 28 to be seen. A portion 32 of the separation chamber 28 is visible to a user and once it appears that the level within the separation chamber 28 is nearing full capacity, a user can remove the separation chamber 28 and empty it. For example, the separation chamber 28 can be unscrewed for emptying. The present invention contemplates cleaning the device by drawing in a cleaning solution through the device and then emptying the contents of the separation chamber 28. The ability of the device to be used in this manner promotes food safety. The present invention also contemplates that multiple separation chambers can be used. A second separation chamber is preferably smaller than the first separation chamber and provides for overflow.

Figure 2:
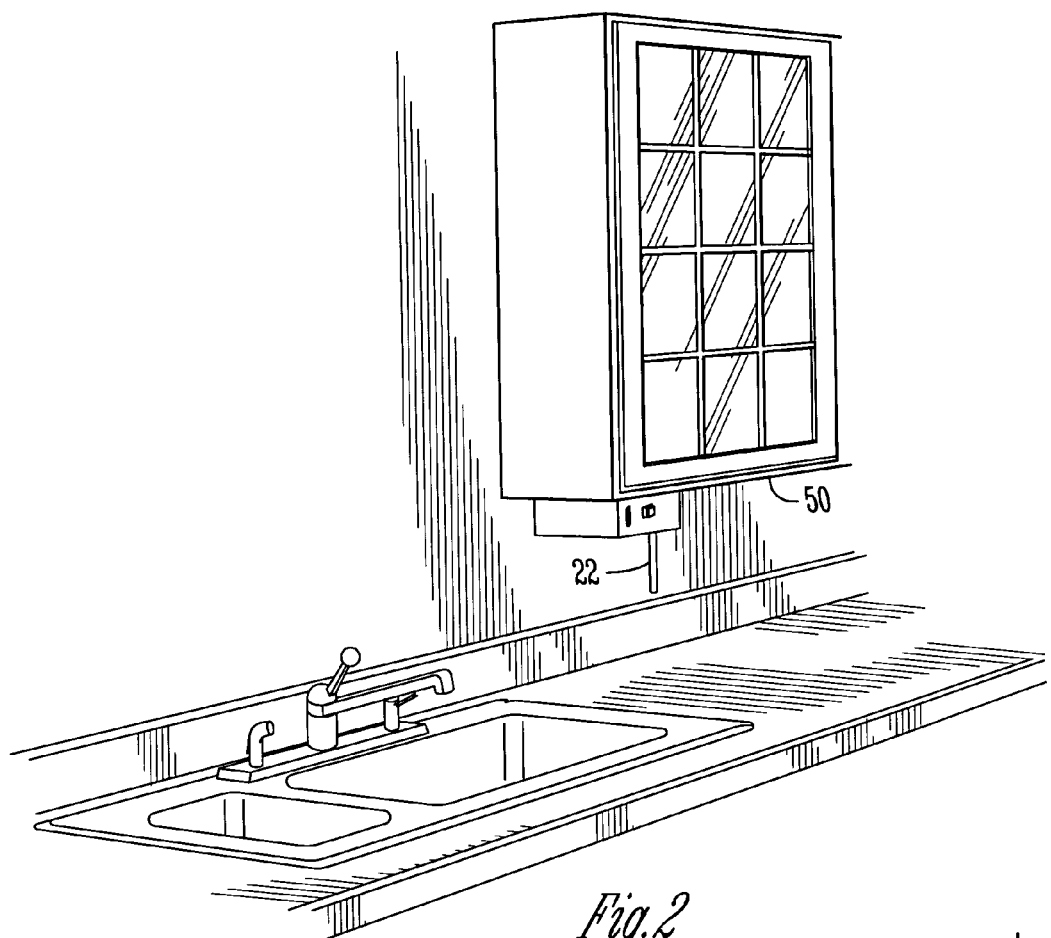
FIG. 2 illustrates one embodiment of an air evacuation device of the present invention mounted underneath a cabinet.

FIG. 2 illustrates one embodiment of the device 10 of the present invention as attached to a cabinet 50. Although attached to a cabinet 50 as shown, the device can also be mounted underneath items or areas which may offer more convenient operation in particular environments.

Figure 3:
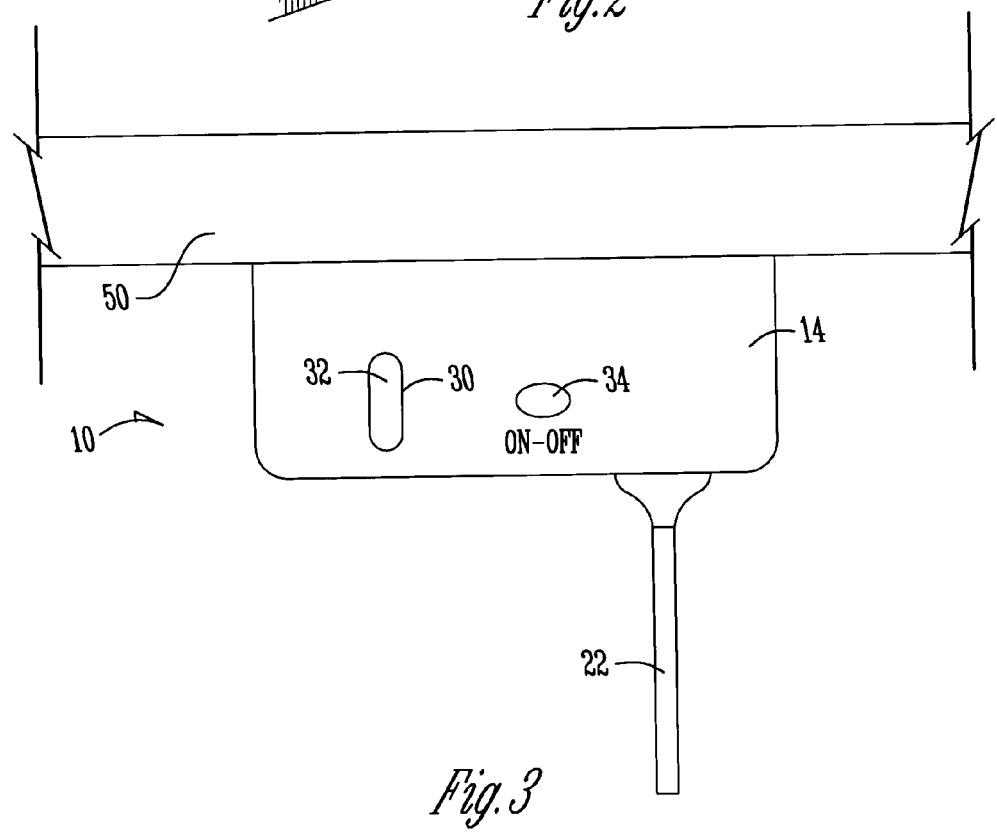
FIG. 3 provides a front view of one embodiment of an air evacuation device of the present invention mounted underneath a cabinet illustrating the device.

FIG. 3 illustrates how device 10 is attached underneath the cabinet 50. Preferably the device 10 is attached through fasteners such as adhesive tape, suction cups, or other means that can attach the device 10 to the cabinet or other area without damaging them. Alternatively, fasteners known in the art such as screws can be used. Also, as shown in FIG. 3, an on/off button 34 is shown to turn the vacuum of the device on and off.

Figure 4:
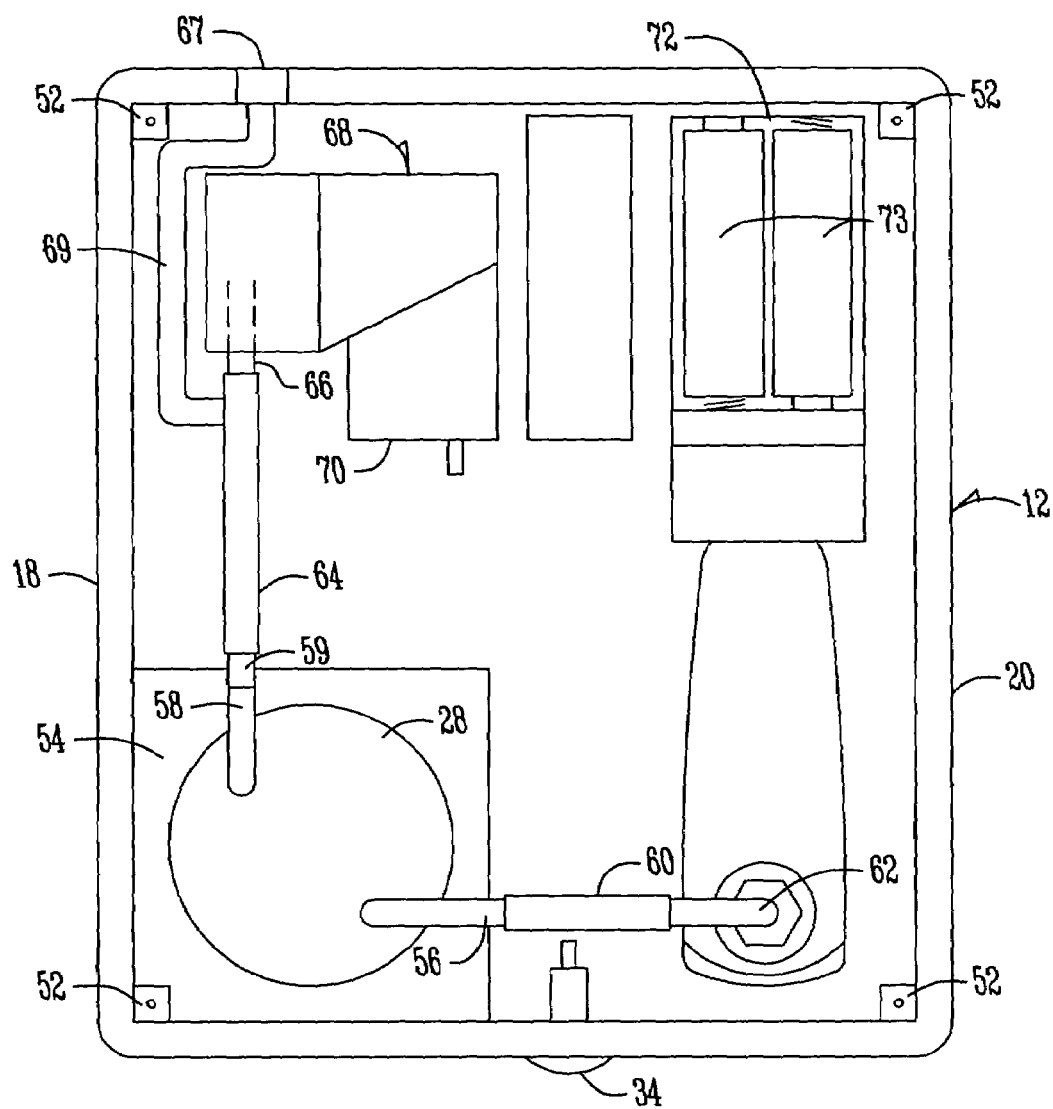
FIG. 4 provides a top view of one embodiment of an air evacuation device of the present invention showing the insides of the housing or enclosure.

FIG. 4 provides a top view showing the inside of the housing 12 of the evacuation device. Standoffs 52 are shown that can be used to receive screws in order to attach a cover to the device. A separation area 54 is shown where the separation chamber 28 is stored. Air is pulled through the nozzle (not shown) and then through the outlet 62. Air continues to be evacuated through the air conduit 60 and through the inlet 56 to the separation chamber 28. An outlet 58 to the separation chamber is also shown. Preferably at the outlet 58 is a filter 59 so that liquid matter and particulate matter remains in the separation chamber 28 and is not drawn into the pump 68. An air conduit 64 is shown. Air is drawn through the conduit 64, through the inlet 66 of the conduit and into the vacuum pump 68. The vacuum pump 68 includes a motor 70. The present invention contemplates the ability to vary the vacuum/pressure of the device. An aperture 67 is preferably located in the housing 12 near the vacuum pump 68 to vent the air from the housing 12. The discharge from the pump can be exhausted outside the device or internally collected. In FIG. 4, there is a pump exhaust tube 69 shown for exhausting discharge from the pump to the outside through aperture 67.

Although only a single separation chamber is shown, the present invention allows there to be a second separation chamber to be in service with a first separation chamber 28. For example, the second separation chamber is smaller than the first separation chamber and can be used for overflow.

The present invention contemplates that the device can be either battery powered or power line driven, or both. A battery cage 72 is shown with battery connections and batteries 73. Where power line driven, typically a power supply including a transformer is used based upon the requirements of the motor 70 or other electrical components which could include backlit switching or buttons, an electronic display or controls, or other electronic components. The present invention contemplates that the device can be combined with other electric or manual appliances, storage apparatus and devices.

Figure 5:
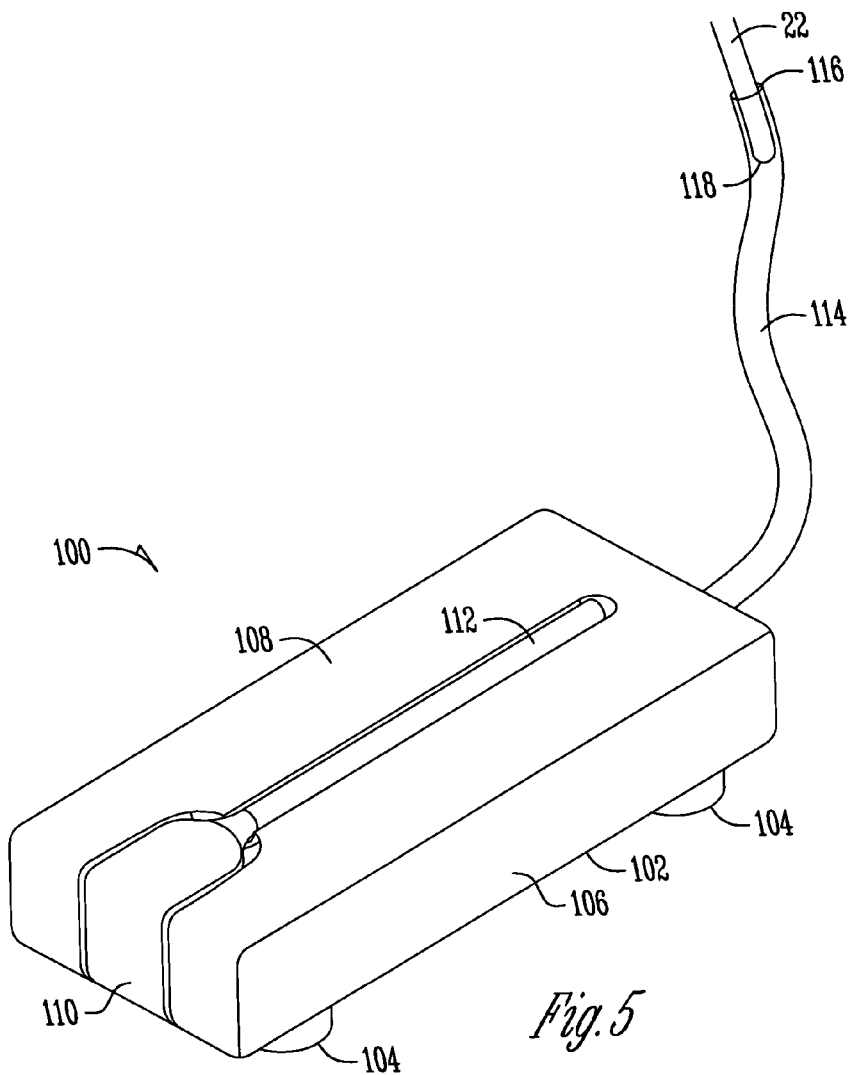
FIG. 5 shows a perspective view of one embodiment of an accessory device that can be used with an air evacuation device according to one embodiment of the present invention.
Figure 6:
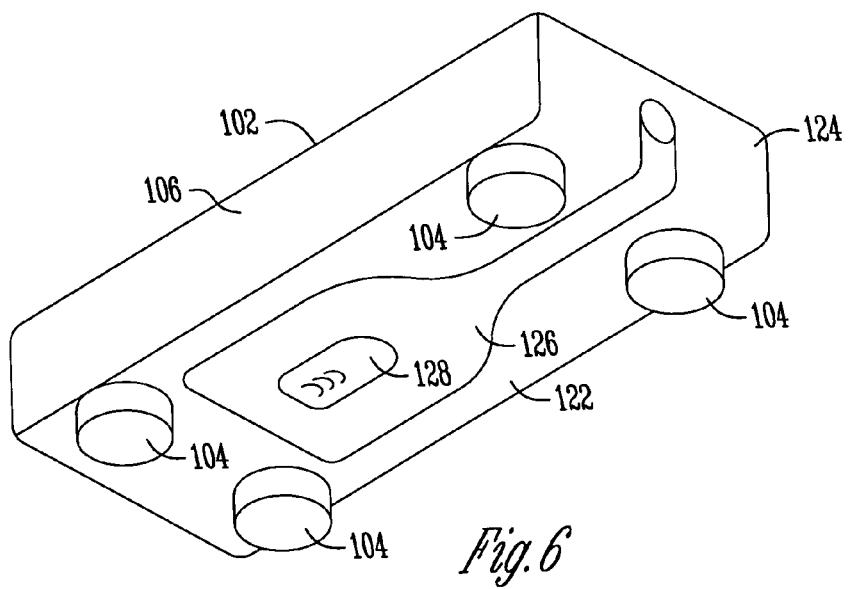
FIG. 6 provides a perspective view illustrating the bottom side of the accessory device shown in FIG. 5.

FIGS. 5 and 6 show an accessory to the air evacuation device. The accessory 100 can be used with an air evacuation device mounted under a cabinet or other area allowing access to the nozzle. The accessory 100 can be placed on a countertop to provide more convenient access to a nozzle for air evacuation and to use the evacuation device with larger containers. The accessory device 100 includes a housing 102. In addition, there is a plurality of feet 104 operatively connected to the housing 102. The present invention contemplates that the feet 104 are suction cups or can be other types of feet or nonskid surface that help prevent the accessory 100 from skidding or sliding where the device is used. The housing 102 of the accessory 100 includes side walls, such as 106, and a top surface 108. A positionable fitting 110 is shown that connects to the nozzle 112. The nozzle 112 can fit into a recessed portion of the housing 102. There is an air conduit such as a plastic tube between the housing 102 and the air evacuation device 10. The air conduit 114 is preferably fit over either an extension to the nozzle or the nozzle 22 of FIG. 1 of the air evacuation device so that the inlet 118 of that nozzle or extension fits into the air conduit 114 and the outlet 116 of the air conduit 114 fits over the tube or nozzle 22 of FIG. 1 to provide a sufficiently tight fit to allow for evacuation.

FIG. 6 illustrates a perspective view of the bottom of the accessory device. A bottom surface 122 is shown with a side wall 124. There is a compartment 126 that can be opened and removed with the thumb tab 128 or anything known in the art. The compartment 126 can be used to store extra nozzles or extra tubing or other types of air conduits.

FIG. 7 illustrates a plurality of different nozzle that can be used with the air evacuation devices of the present invention. Each of the nozzles has a base portion 186 that allow for attachment of the nozzle in a uniform manner. The types of nozzles include a right angled nozzle 180, a straight nozzle 182, and a wide nozzle 184. Another variation shown is a diamond-shaped nozzle 185. This shape can also be described as an eye-like shape. This allows a user's fingers to slide together in the process of sealing the bag to encourage a tight seal. The present invention can incorporate nozzles of various shapes with various lengths, sizes, diameters, and other variations. The present invention contemplates the ability to use this device with other containers known in the art of evacuation.

FIGS. 8–10 show another embodiment of an air evacuation device of the present invention. The device 130 is shown in a top view in FIG. 8, a front view in FIG. 9, and a side view in FIG. 10. The device 130 includes an arm 138. An electrical cord 142 with a plug 144 is shown extending from the power supply 146 of the device. Other electrical connections include, but are not limited to, an electrical connection 148 from 141 to the pump portion 156. This device can also use alternate power sources.

The device 130 includes side walls 134, 132 and 136. In the device 130, a separation chamber 150 is shown with an air conduit 152 to draw air through the separation chamber 150 by the pump 156. The level of the separation chamber can be checked through sight 162. Air is drawn through the air conduit 154 of the device into the separation of chamber 150. The present invention contemplates the ability to vary the vacuum/pressure of the device, and a user interface or controls for varying the vacuum/pressure of the device.

A release 158 is also shown in FIGS. 8–10 for releasing the compartment 172 shown in FIG. 10. FIG. 9 shows the front portion of the arm 138. The foldable nozzle 168 is placed within the arm. A release mechanism 170 is shown to release the nozzle 168 attached to the positionable fitting 166 from a locked position. Another release mechanism 160 releases the arm 138.

Figure 11:
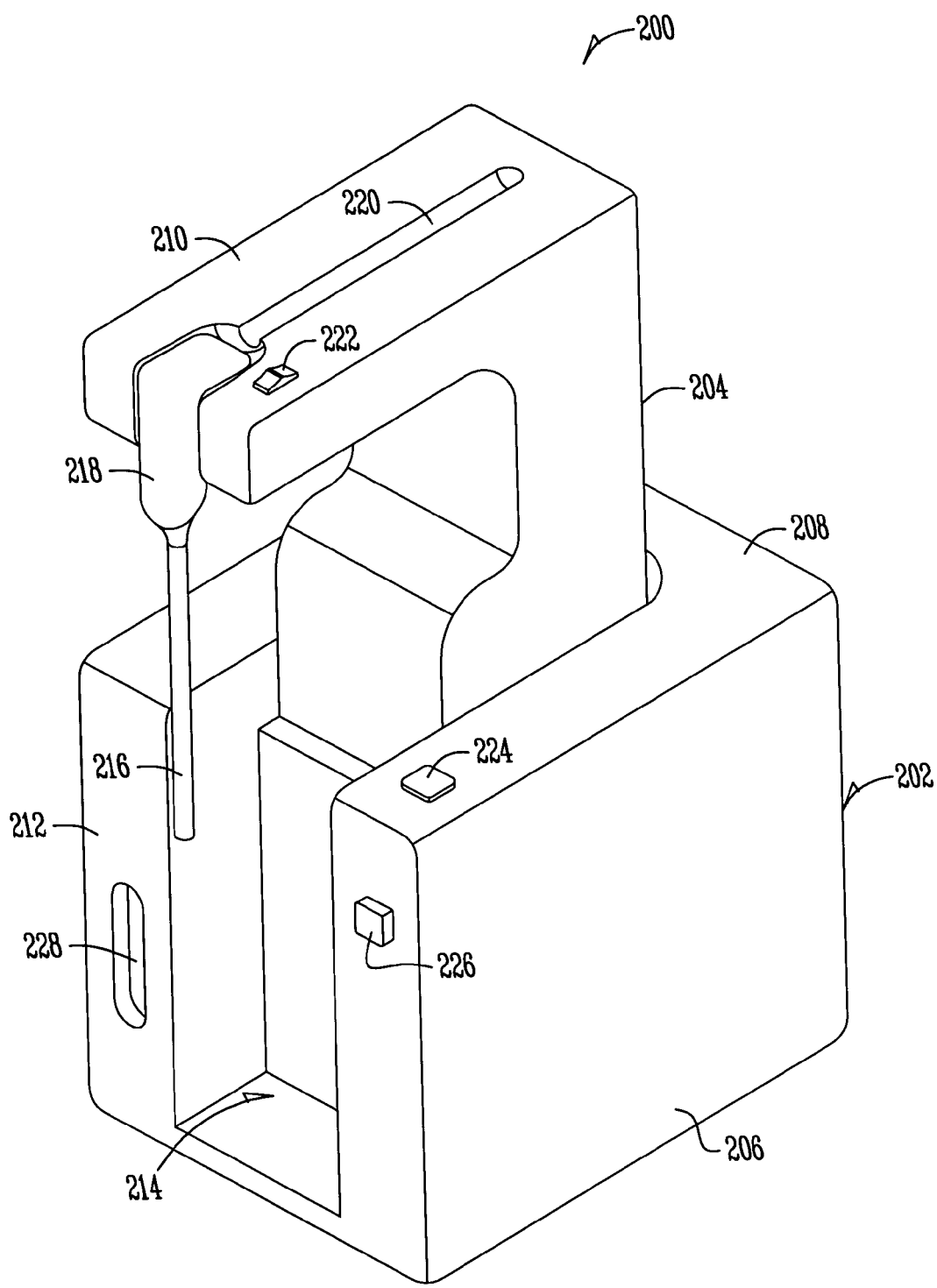
FIG. 11 provides a perspective view of one embodiment of an air evacuation device of the present invention with an arm in an extended position.

FIG. 11 shows a perspective view of one embodiment of an air evacuation device of the present invention. The device 200 shown can be used on top of a counter such as on a countertop in a kitchen. The device 200 includes a top 208 and a side 206. The device 200 includes a housing 202 having an arm 204 and face of the arm 210. A portion of the housing 202 that does not include the arm 204 can be considered the base portion. A front housing 212 of the device is shown with a recess 214 for containing the arm 204. Attached to the arm 204 is a fitting 218 for a preferably removable nozzle 216. The nozzle 216 can be placed into the recess 220 for storage and compactability while not in use. A release mechanism 222 is shown to release or lock the nozzle in place. Similarly, a release mechanism 224 for the arm 204 can be used to release the arm 204 prior to transitioning the arm 204 to the upright position. By being able to position the arm 204 and the nozzle 216, the device 200 accommodates containers of various shapes and sizes. The present invention contemplates the ability to use this device with other containers known in the art of evacuation.

Other features of the device 200 include a power button 226. In addition, there is an indicator such as a sight 228 for determining the level within a separation chamber within the device 200. Although a sight is shown, the present invention contemplates that other types of indicators can be used, including electronic indicators to display or indicate the fill level of the separation chamber. In such a system, a sensor may be used to detect the fill level.

Figure 12:
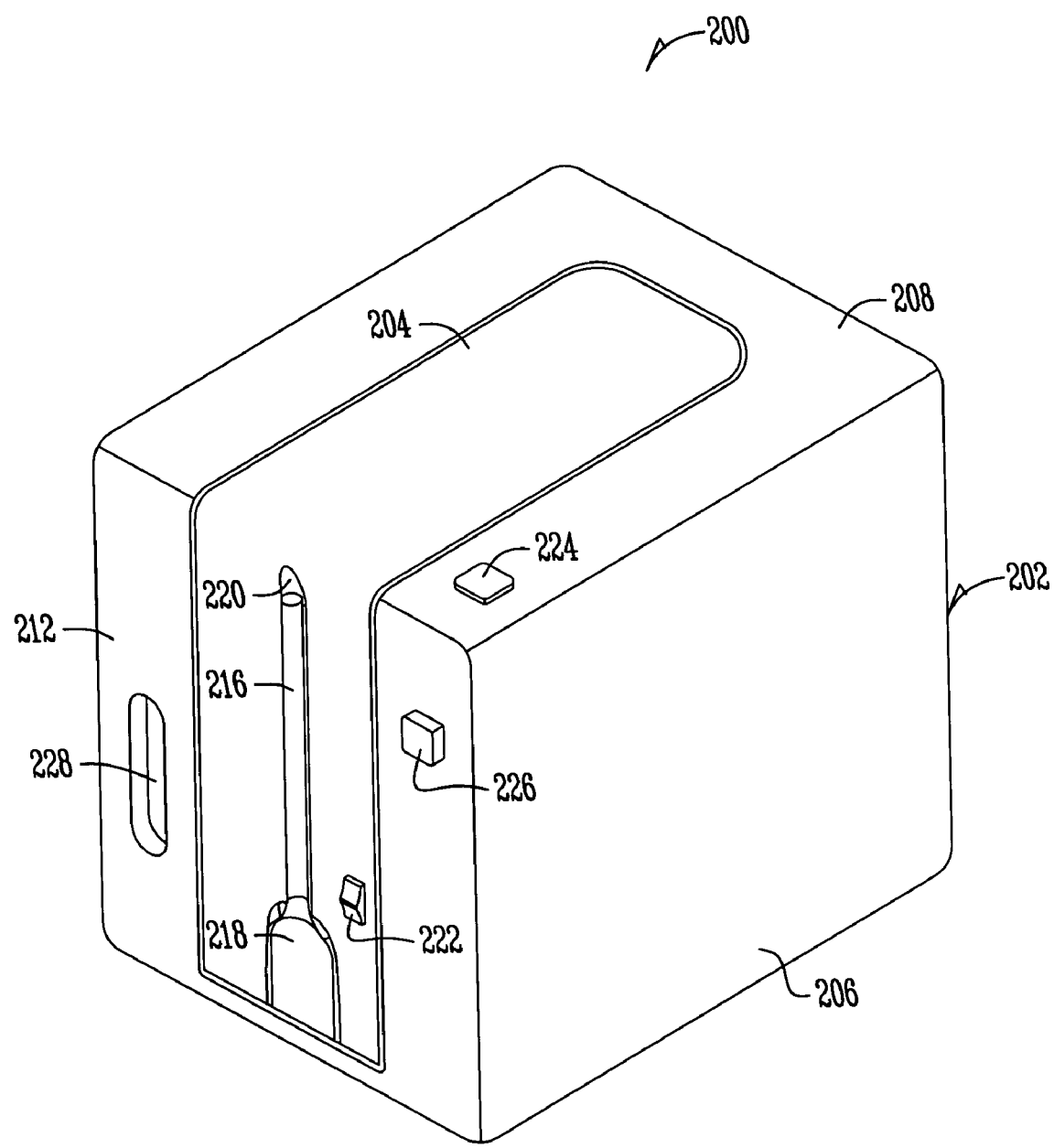
FIG. 12 provides a perspective view of one embodiment of an air evacuation device of the present invention with an arm in a closed position.
Figure 13:
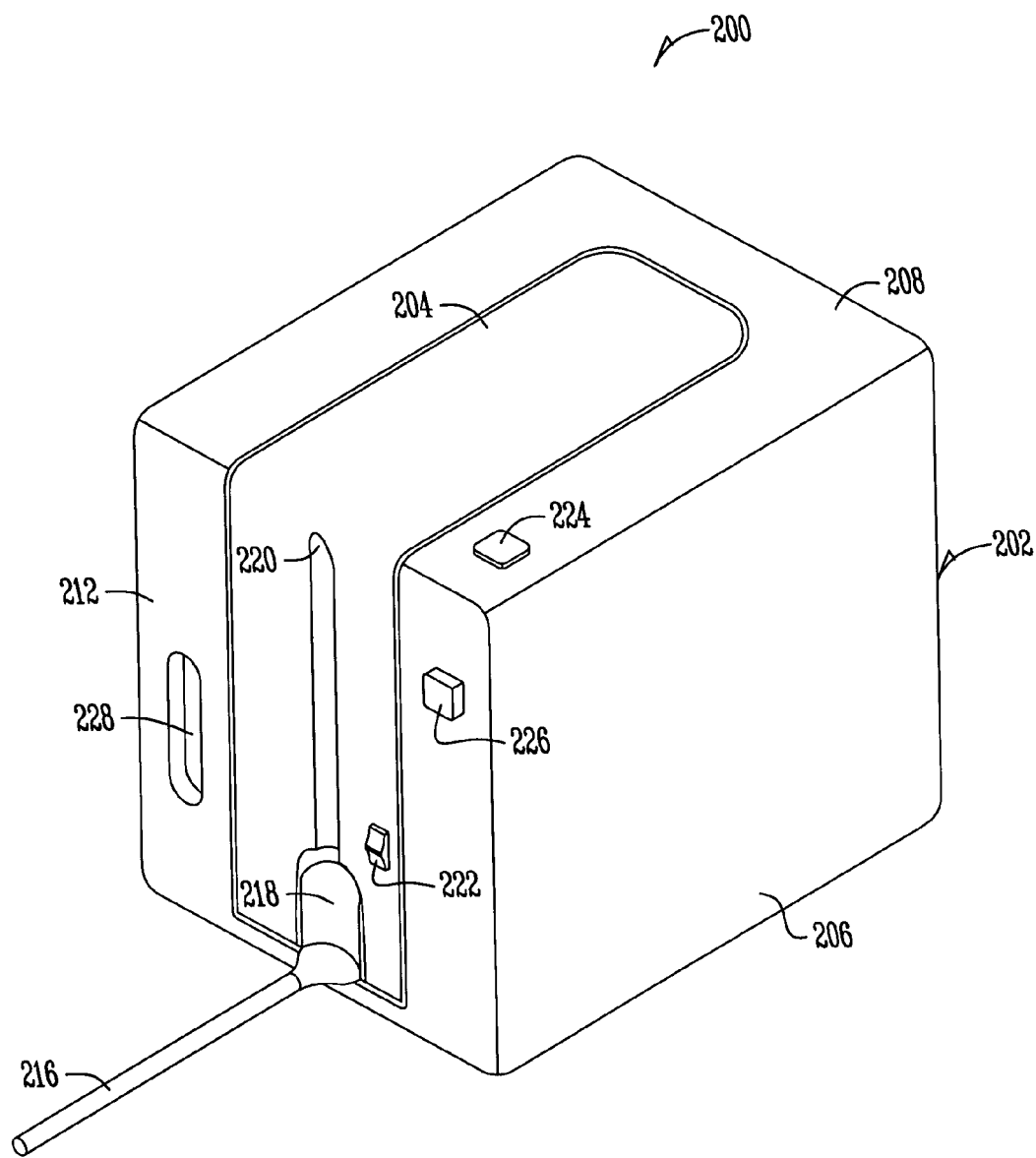
FIG. 13 provides a perspective view of one embodiment of an air evacuation device of the present invention with an arm in a closed position and a nozzle extending outwardly from the device.

FIG. 11 illustrates the arm 204 in a position where the arm 204 extends upwardly and outwardly from the base portion of the housing 202. FIG. 12, on the other hand, shows the arm 204 in a closed position. The nozzle 216 can still be folded away from the housing 202 for use, as is shown in FIG. 13, which shows the nozzle folded outward from the housing 202. Thus, given the multiple positions of the arm and the multiple positions of the nozzle, containers of various sizes and shapes are accommodated. The present invention contemplates that the device can be combined with other electric and/or manual appliances, storage apparatus, and other devices.

The present invention contemplates that various embodiments such as those shown in FIGS. 1–13, have the ability to have all cleanable parts dishwasher safe to promote food safety. The present invention also contemplates that plastic bag containers can be specially designed for use with the air evacuation device of the present invention, including single seal closures.

Figure 14:
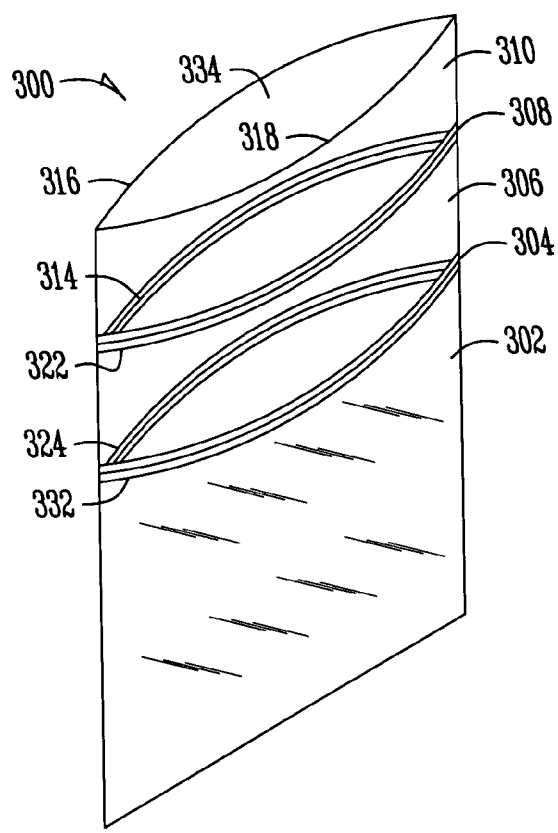
FIG. 14 provides a perspective view of one embodiment of a plastic bag container of the present invention.

FIGS. 14–17 illustrate various plastic bag containers that can be used according to the present invention. FIG. 14 illustrates a perspective view of a plastic bag 300. The plastic bag 300 has a bottom portion 302 for storage of food or other types of items. Above the bottom portion 302 is an open seal 304. There is a second seal 308 shown, although the present invention contemplates that additional seals can also be used in conjunction with sealing enhancers. There is a separator portion of the bag 306 between the first seal 304 and the second seal 308. The separator portion substantially spaces the first seal and the second seal so they can be sealed independently and in the event one seal may be damaged, the other seal is unlikely to be damaged. Above the second seal 308 is the top portion 310. The bag also is formed from sides 316 and 318 that can be drawn together to be sealed. When open as shown, an opening 334 exists so that food or other items can be placed in the container prior to sealing. The seals are formed from pairs of fastening strips. For example, there is a first fastening strip 314 and a second fastening strip 322 that matingly interlock to fasten the side 316 and side 318 of the plastic bag together to form the second seal. Similarly, there is a second fastening strip 332 and a first fastening strip 324 that matingly interconnect or interlock to form a first seal 304. The precise manner of interlocking or forming the seal can be of various types known to one skilled in the art. The present invention contemplates numerous types of seals including zippered seals, color coded seals, seals with special coating to enhance sealing and other types of seals known in the art.

Figure 15:
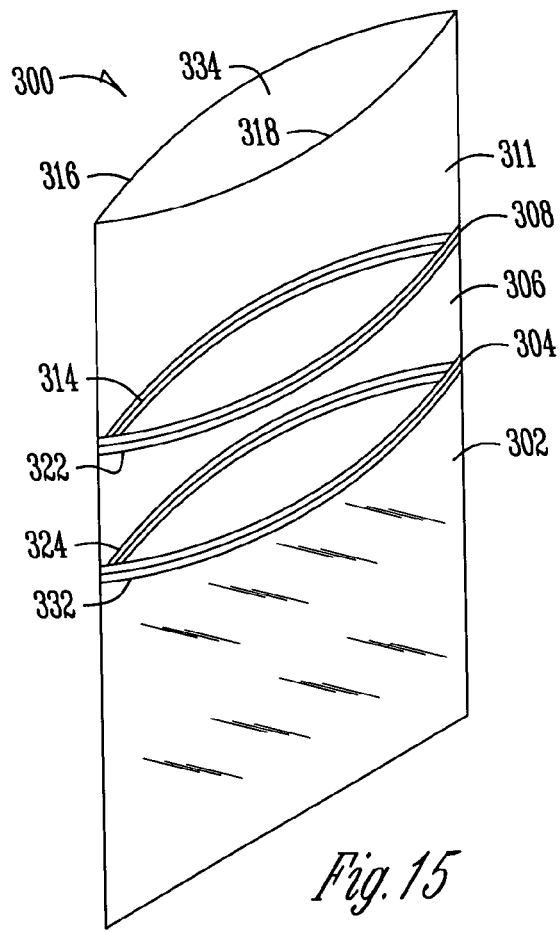
FIG. 15 provides a perspective view of another plastic bag container according to the present invention.
Figure 16:
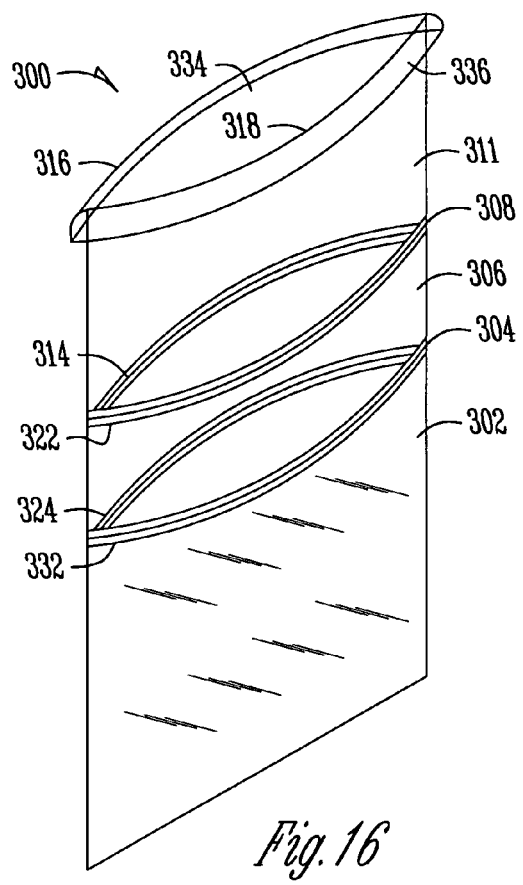
FIGS. 16 and 17 provide perspective views of one embodiment of a plastic bag container according to the present invention where the top portion of the plastic bag is folded or cuffed downward.
Figure 17:
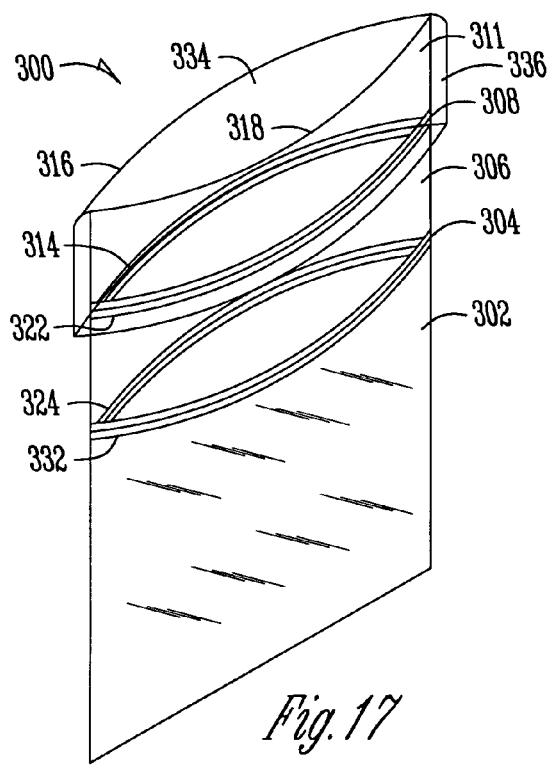

FIG. 15 shows a plastic bag container similar to that shown in FIG. 14, except for that there is a top portion 311 which is greater in length than the top portion 310 shown in FIG. 14. However, in both embodiments, the top portion 310 or 311 are substantially above the top seal 308. The reason for this configuration is shown in FIGS. 16 and 17. The top portion 311 can be folded over to form a flap or cuff 336. The flap or cuff 336 can be continued to be pulled down such as shown in FIG. 17. This provides advantages relative to food safety, cleanliness and ease of filling. The flap can be pulled down prior to filling the container 300. This reduces the likelihood of spills or splatter onto the outside of the plastic bag. Instead, a splatter would be caught by the inside of the bag. The cuff provides an untouched surface for food safety handling and storage. The bag could include a means of protecting the seal from contaminants while filling the bag to promote the best possible seal. It is seen as a disadvantage for such splatter to be present on the outside of a bag because aside from the messy appearance, there is the possibility of bacteria or other undesirable contents to more easily contaminate the inner contents of the bag or the user.

Another advantage of the bag of the present invention is that the substantial spacing between the first seal and the second seal allow for greater assurance that the seals are properly made and the contents are appropriately contained. For example, even if the first seal is broken, the second seal remains and vice versa. Similarly, even if the first seal is damaged, the second seal is likely undamaged given the spaced apart nature of the seals. This is particularly important when the plastic bags are evacuated or reused. There is preferably at least an approximately half a finger tip width distance between the seals when more than one seal is provided. This distance allows for more easily sealing the seals independently of one another.

When the bag has air evacuated, the present invention allows air to be evacuated from the container portion first and then the portion separated between the first seal and the second seal, if desired. The present invention contemplates numerous types of plastics, plastic thicknesses, plastic liners, bags within a bag, channels in the bag to aid in air removal, textured inside surfaces, varying thickness, closure alignment ribs, the ability of being microwavable and reusable, and other types of bag designs known in the art.

Figure 18:
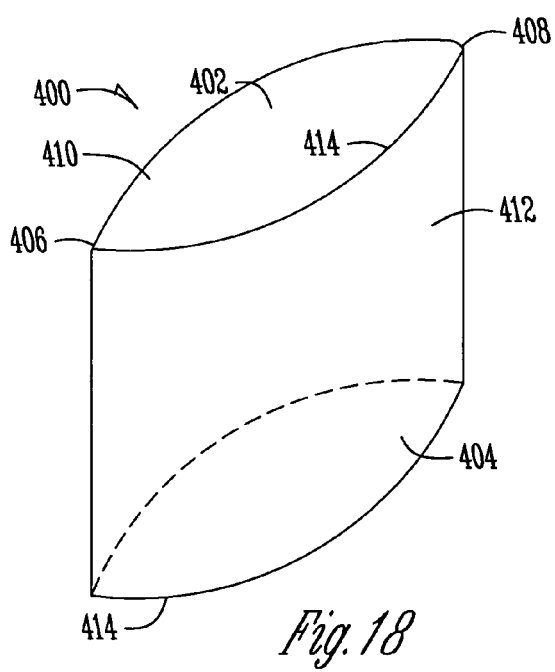
FIG. 18 provides a perspective view of a rigid container in the ergonomic shape of an opened plastic bag container.

FIG. 18 illustrates one embodiment of a rigid device 400 that can be used in conjunction with a container. The device 400 is particularly well adapted for use with a plastic bag. The device 400 is used in the fill process. The device 400 includes an opening 402 defined by a perimeter 414 which includes ends 406 and 408. Opposite side walls 410 and 412 extend downwardly from the perimeter to a bottom perimeter 414 that can enclose either a bottom surface or opening 404.

The device 400 has a rigid shape that accommodates a plastic bag or other flexible container. The shapes of the device protects the corners of a plastic bag from undue wear and tear as it restricts movement of the sides of the bag away from one another. In operation, the plastic bag or other container is placed inside the device 400. The top portion of the plastic bag can then be cuffed down over the top perimeter 414 of the device 400 when the bag is being filled. The device 400 is particularly advantageous for holding a plastic bag to fill it with a liquid, but can also be used in other contexts as well.

For example, the device 400 can be used for holding a plastic bag while it is being filled with meat. This reduces the opportunity for meat to contact the outside of the plastic bag which could later lead to contamination or spread of bacteria. The rigid device 400 is preferably microwavable and dishwasher safe. The rigid device 400 is essentially in the shape of an open bag to aid in the filling process while helping to protect the seal. When a bag is cuffed over the device 400, preferably at least an inch of the bag is folded over the rigid device 400. In such an embodiment, the top most seal is then located more than one inch from the top of the plastic bag.

The invention also contemplates that sometimes it would be advantageous to provide a rigid structure or support for items prior to evacuation. FIG. 19 illustrates one embodiment of a device for that purpose. FIG. 19 illustrates a storage container 350 having a bottom portion 352 and a top portion 354. The bottom portion 352 has a bottom surface 356, and at least one side wall 358. Along a top edge 390 of the bottom portion 352 there are a plurality of protrusions, such as protrusions 360 and 365 as well as a plurality of recesses such as recesses 362 and 364. The protrusions and recesses are used for interlocking the top portion 354 to a bottom portion 352. In addition, interlocking can be formed through the rims 390 and the placement of edges such as the inner edge 366 which as shown along with outer edge 370 surrounds a depression 368. The top portion 354 can be designed to matingly fit the rim 390 of the bottom portion 352.

The top portion 354 has a bottom surface 372 with at least one side wall 374. Also the top portion 354 has a plurality of protrusions, such as protrusions 382 and 380. In addition, the top portion 354 has a plurality of recesses such as recesses 378 and 376. The protrusions and recesses of the top portion 354 and the protrusions and recesses of the bottom portion 352 are adapted to matingly interconnect to connect the bottom portion 352 of the storage container with the top portion 354 of the storage container.

Similarly, the bottom portion 352 of the storage container 350 and the top portion 354 of the storage container 350 can matingly interconnect through the presence of ridges or recesses along the rims. The rim 388 of the top portion 354 includes an outer edge 384 and an inner edge 386. There is a ridge 383 between the inner edge 386 and the outer edge 384 such that the rim 388 of the top portion 354 matingly connects with the rim 390 of the bottom portion 352 of the storage container 350. The present invention contemplates various locking mechanisms known in the art.

The storage container 350 is rigid in nature and can be made from a plastic material. This rigid storage container can also be used as a plate/paper plate holder and other similar items known in the art of serving and storage devices. This container is preferably microwaveable and dishwasher safe. It can be used to store various items for example cakes that are frozen. The item is placed within the container 350 which is then placed within a plastic bag such as the plastic bag 300 shown in FIGS. 14–17. Air can then be evacuated from the plastic bag in the manner previously described. Because of the rigid support structure provided by the storage container 350, the item stored within the storage container 350 is not smashed against the plastic bag during the air evacuation process. Therefore, this type of item can still be preserved and freshness maintained.

The storage container 350 preferably has an opening. An air evacuation device, such as a nozzle or tube can be used to evacuate air from the container 350. The opening shown is formed from the openings 363 and 381 when the top portion 354 and the bottom portion 352 are connected. This location is merely one convenient means for creating an opening. The present invention contemplates that such an opening can be placed solely in the top portion 354 or solely in the bottom portion 352, and may be of various sizes and shapes.

Therefore, method, apparatus, and a system for air evacuation has been disclosed. The present invention contemplates variations in the shape, materials, configuration, geometry, sizes, and proportions of the devices and component parts disclosed herein, and the connectors and associations of the component parts. These and other variations are within the broad scope of the invention as claimed.

What is claimed is:

1. A device for evacuating a container, comprising:
    a nozzle for placing within the container;
    a pump for moving air;
    a separation chamber for holding liquid or particulate matter;
    an air conduit operatively connecting the nozzle, the separation chamber, and the pump;
    a housing having a top surface, a bottom surface and at least one side wall between the top surface and the bottom surface;
    the pump disposed within the housing;
    wherein the housing includes a rigid fitting and the nozzle is attached to the fitting and in a first position the nozzle extends downwardly beyond the bottom surface of the housing for placement in the container.

2. The device of claim 1 wherein the separation chamber is disposed within the housing.

3. The device of claim 1 wherein the nozzle is removable from the housing.

4. The device of claim 1 wherein the nozzle is foldable and has a second position wherein the nozzle rests against the housing.

5. The device of claim 1 wherein the separation chamber is disposed within the housing and wherein one of the at least one side walls comprises a sight for viewing the separation chamber.

6. The device of claim 1 further comprising a motor associated with the pump and a power source operatively connected to the motor for powering the pump.

7. The device of claim 1 further comprising a fastener for fastening the housing under a surface.

8. The device of claim 1 further comprising an accessory to allow increased distance between the container and the housing comprising:
    an accessory housing;
    an accessory nozzle operatively connected to the accessory housing; and
    an accessory air conduit operatively connected to the nozzle and the accessory nozzle.

9. The device of claim 8 where the nozzle is removable from the housing.

10. The device of claim 8 wherein the accessory housing includes a non-skid material for placement on a surface.

11. The device of claim 8 wherein the accessory nozzle is foldable relative to the accessory housing.

12. The device of claim 1 wherein the separation chamber is disposed within the housing and wherein the device further comprises a sight within the housing for viewing the separation chamber.

13. The device of claim 1 further comprising a filter operatively connected between the separation chamber and the pump.

14. The device of claim 1 wherein the nozzle includes a diamond-shaped end.

15. The device of claim 1 wherein the nozzle includes an eye-shaped end.

16. The device of claim 1 wherein the container is a sealable bag and wherein the nozzle is adapted to allow a user's fingers to slide together during sealing of a bag to encourage tight sealing of the bag.

17. A method of evacuating air from a container, comprising:
    providing a device comprising a housing and a nozzle, having a first end attached to the housing and a second end extending from the housing for placing within the container without requiring the container to come in contact with the housing, a first air conduit operatively connecting the nozzle and a separation chamber, and a second air conduit operatively connected to the separation chamber and a pump;
    inserting the nozzle into the container;
    evacuating air from the container;
    sealing the container with a first reusable manual seal.

18. The method of claim 17 further comprising evacuating air from a portion of the container between the first reusable manual seal and a second seal, sealing the second seal, and removing the nozzle from the container.

19. The method of claim 17 further comprising placing items within the container prior to evacuating air from the container.

20. The method of claim 17 wherein the container is a sealable plastic bag.

21. The method of claim 20 further comprising providing a rigid container for storing items, placing the items within the rigid container, and placing the rigid container within the sealable bag, and thereafter evacuating air from the rigid container.

22. The method of claim 17 wherein the sealing is adapted to be performed by sliding fingers of a user together during sealing to encourage tight sealing of the first seal.

23. The method of claim 17 wherein the nozzle is adapted to allow fingers of a user to slide together during sealing.

24. The method of claim 17 wherein the nozzle is shaped to include an eye-shaped end.

25. The method of claim 17 wherein the nozzle is shaped to include a diamond-shaped end.

26. A system for storage, comprising:
a reusable plastic bag having at least one reusable manual seal;
a device for evacuating air comprising a housing and a nozzle having a first end attached to the housing and second end extending away from the housing for placing within the plastic bag;
a first air conduit operatively connecting the nozzle and a separation chamber disposed within the housing and a second air conduit operatively connecting the separation chamber and a pump disposed within the housing; and
a rigid container placeable within the plastic bag.

27. The system of claim 26 wherein the nozzle is foldable relative to the housing.

28. The system of claim 26 wherein the at least one seal comprises a first seal formed by a first set of first and second fastening strips; a second seal formed by a second set of first and second fastening strips; a gap between the first seal and the second seal sufficiently large such that the first seal is independent of the second seal and the bag is reusable and sealable even if one of the plurality of seals is damaged.

29. The system of claim 26 wherein the rigid container comprises a first portion and a second portion; the first portion having a first fastening rim and the second portion having a second fastening rim.

30. The system of claim 29 wherein each of the fastening rims has a plurality of protrusions and a plurality of recesses for interlocking.

31. The system of claim 29 wherein the first fastening rim includes at least one ridge and the second fastening rim has at least one depression for mating the first fastening rim with the second fastening rim.

32. The system of claim 26 wherein the at least one seal is positioned substantially below a top edge of the bag to allow for the top of the bag to be folded back to reduce splatter on an outer surface of the bag.

33. The system of claim 26 wherein the rigid container further comprises an opening for providing access to an air evacuation device.

34. The system of claim 26 wherein the nozzle is adapted to allow fingers of a user to slide together during sealing.

35. The system of claim 34 wherein the nozzle includes an eye-shaped end.

36. The system of claim 34 wherein the nozzle includes a diamond-shaped end.

37. A device for evacuating a container, comprising:
a nozzle for placing within the container;
a pump within a housing for moving air;
a separation chamber for holding liquid or particulate matter;
an air conduit operatively connecting the nozzle, the separation chamber, and the pump;
wherein the nozzle is foldable such that in a first position the nozzle extends downwardly and outwardly from the housing and in a second position the nozzle rests against the housing;
wherein the housing includes a top surface, a bottom surface and at least one side wall between the top surface and the bottom surface, the bottom surface having a recessed portion receiving the nozzle in the second position.

38. A device for evacuating a container, comprising:
a nozzle for placing within the container;
a pump for moving air;
a separation chamber disposed within a housing for holding liquid or particulate matter;
art air conduit operatively connecting the nozzle, the separation chamber, and the pump;
the housing having a base and an arm and a fitting attached to the arm;
wherein the nozzle is attached to the fitting and rotatable with respect to the arm.

39. The device of claim 38 wherein the arm movably extends outwardly and upwardly from the base.

40. A device for evacuating a container, comprising:
a nozzle for placing within the container;
a pump for moving air;
a separation chamber for holding liquid or particulate matter;
an air conduit operatively connecting the nozzle, the separation chamber, and the pump;
a housing wherein the pump is disposed within the housing;
an accessory to allow increased distance between the container and the housing comprising:
an accessory housing;
an accessory nozzle operatively connected to the accessory housing; and
an accessory air conduit operatively connected to the nozzle and the accessory nozzle; and
wherein the nozzle is removable relative to the housing.

41. A device for evacuating a container with a resealable seal, comprising:
a housing;
a nozzle having a first end attached to the housing and an opposite second end for placing within the container, the nozzle adapted to extend the second end away from the housing;
a pump for moving air;
a separation chamber for holding liquid or particulate matter;
an air conduit operatively connecting the nozzle, the separation chamber, and the pump;
and wherein in a first position the second end of the nozzle extends downwardly for placement into the container without contact between the container and the housing.

42. A device for evacuating a container, comprising:
a housing;
a nozzle having a first end and opposite second end;
a pump for moving air;
a separation chamber disposed within the housing for holding liquid or particulate matter;
an air conduit operatively connecting the nozzle, the separation chamber, and the pump;
the housing having a top surface, a bottom surface and at least one side wall between the top surface and the bottom surface;
the pump disposed within the housing; and
wherein the first end of the nozzle is attached to the housing and in a first position the nozzle extends outwardly and downwardly along one of the at least one sidewall of the housing for placing the second end of the nozzle within the container.

43. A device for evacuating a container, comprising:
a nozzle for placing within the container;
a pump for moving air;
a separation chamber for holding liquid or particulate matter;
an air conduit operatively connecting the nozzle, the separation chamber, and the pump;
a housing having a top surface, a bottom surface and at least one side wall between the top surface and the bottom surface;
the pump disposed within the housing;
wherein in a first position the nozzle extends downwardly beyond the bottom surface of the housing for placement in the container; and
wherein the nozzle is foldable and has a second position wherein the nozzle rests against the housing.

44. A system for storage, comprising:
a reusable plastic bag having at least one reusable manual seal;
a device for evacuating air comprising a housing and a nozzle extending away from the housing for placing within the plastic bag;
a first air conduit operatively connecting the nozzle and a separation chamber and a second air conduit operatively connecting the separation chamber and a pump disposed within the housing;
a rigid container placeable within the plastic bag; and
wherein the nozzle is foldable relative to the housing.

45. A device for evacuating a container, comprising:
a nozzle for placing within the container;
a pump for moving air;
a separation chamber for holding liquid or particulate matter;
an air conduit operatively connecting the nozzle, the separation chamber, and the pump;
a housing having a base and an arm;
wherein the nozzle is operatively connected to the arm and rotatable with respect to the arm; and
wherein the arm movably extends outwardly and upwardly from the base.

* * * * *

UNITED STATES PATENT AND TRADEMARK OFFICE
CERTIFICATE OF CORRECTION

PATENT NO. : 7,086,211 B2 Page 1 of 1
APPLICATION NO. : 10/681598
DATED : August 8, 2006
INVENTOR(S) : Bassett et al.

It is certified that error appears in the above-identified patent and that said Letters Patent is hereby corrected as shown below:

Col. 12, Line 11:
DELETE: "art" before "air conduit"
ADD: --an-- before "air conduit"

Signed and Sealed this

Twenty-sixth Day of September, 2006

JON W. DUDAS
*Director of the United States Patent and Trademark Office*